(12) United States Patent
Osawa et al.

(10) Patent No.: US 12,194,524 B2
(45) Date of Patent: Jan. 14, 2025

(54) PRESS FORMING METHOD

(71) Applicant: HONDA MOTOR CO., LTD., Tokyo (JP)

(72) Inventors: Kaori Osawa, Tochigi (JP); Syohei Okuzumi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 17/791,536

(22) PCT Filed: Jan. 8, 2021

(86) PCT No.: PCT/JP2021/000436
§ 371 (c)(1),
(2) Date: Jul. 8, 2022

(87) PCT Pub. No.: WO2021/141104
PCT Pub. Date: Jul. 15, 2021

(65) Prior Publication Data
US 2023/0032130 A1 Feb. 2, 2023

(30) Foreign Application Priority Data
Jan. 8, 2020 (JP) .................... 2020-001160

(51) Int. Cl.
*B21D 22/26* (2006.01)
(52) U.S. Cl.
CPC .................... *B21D 22/26* (2013.01)

(58) Field of Classification Search
CPC ........ B21D 22/20; B21D 22/26; B21D 22/30; B21D 5/01; B21D 53/88
See application file for complete search history.

(56) References Cited

U.S. PATENT DOCUMENTS

| 2011/0016945 | A1 | 1/2011 | Nakao et al. |
| 2016/0375477 | A1 | 12/2016 | Tanaka et al. |
| 2017/0151599 | A1* | 6/2017 | Miyagi ................. B21D 53/88 |
| 2018/0117655 | A1 | 5/2018 | Kubo et al. |

(Continued)

FOREIGN PATENT DOCUMENTS

| JP | 2011025263 A | 2/2011 |
| JP | 2012024837 A | 2/2012 |

(Continued)

*Primary Examiner* — Teresa M Ekiert
(74) *Attorney, Agent, or Firm* — CKC & Partners Co., LLC

(57) ABSTRACT

In this press forming method, a formed product which has a hat-shaped cross section, and which is provided with a top surface portion, an outward corner portion, a vertical wall portion, an inward corner portion, and a flange portion, is formed. In a draw forming step, an intermediate formed product 8 including a protruding portion 81 and a recessed portion 83 is formed. The curvature of the protruding portion 81 and the recessed portion 83 are greater than those of the outward corner portion and the inward corner portion, and the cross-sectional shape of the protruding portion 81 is caused to bulge further toward the top surface portion side in a pressing direction F than the outward corner portion. In a restrike forming step, the outward corner portion and the inward corner portion are formed by pushing the protruding portion 81 down in the pressing direction F.

8 Claims, 10 Drawing Sheets

(56) References Cited

U.S. PATENT DOCUMENTS

2018/0172034 A1* 6/2018 Miwa .................... B21D 53/26
2019/0084025 A1* 3/2019 Otsuka .................. B21D 22/20
2019/0176204 A1* 6/2019 Suzuki .................. B21D 22/24

FOREIGN PATENT DOCUMENTS

| | | |
|---|---|---|
| JP | 2016203255 A | 12/2016 |
| JP | 6376048 B2 | 8/2018 |
| WO | 2015098871 A1 | 7/2015 |

* cited by examiner

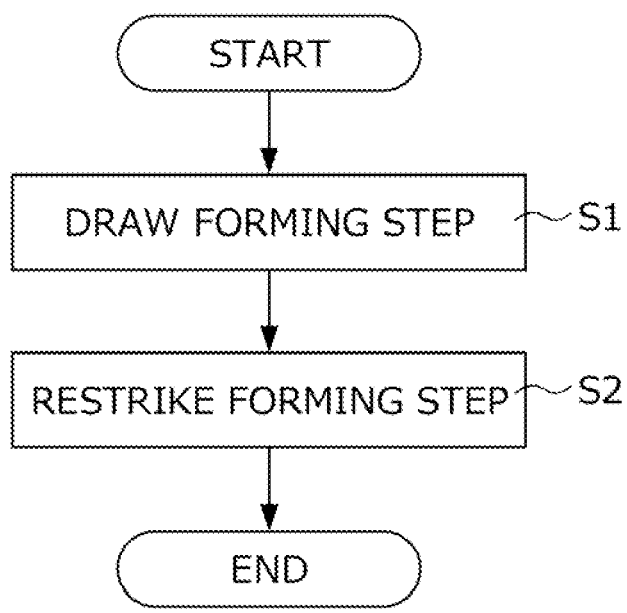

PRESS FORMING METHOD

TECHNICAL FIELD

The present invention relates to a press forming method. More specifically, the present, invention relates to a press forming method of forming a workpiece into a formed product having a hat shape as seen in cross section, by way of a draw forming step and a restrike forming step.

BACKGROUND ART

In recent years, more and more electric vehicles are being produced. Many electric vehicles run by driving a motor with electric power supplied from a battery. The battery is installed in the vehicle body in a state of being contained in a box-shaped battery case. The battery case preferably has as large a volume as possible, to allow for as many battery cells as possible to be housed within the battery case.

Bottomed vessels having a hat-shaped cross section used in such battery cases may be formed, for example, by draw forming. Patent Document 1 discloses a press forming method for forming a formed product having a hat-shaped cross section by draw forming while suppressing wrinkling by using a blank holder.

Patent Document 1: Japanese Unexamined Patent Application, Publication No. 2012-24837

DISCLOSURE OF THE INVENTION

Problems to be Solved by the Invention

In order to make the volume of the battery case as large as possible as mentioned above, the radii of curvature in a cross-sectional view at the outward and inward corners of the case should be as small as possible. However, when forming a formed product into such a shape using draw forming, part of the material may be dragged by the punch, which is likely to cause cracking.

In order to prevent the occurrence of cracking, it would be conceivable to adjust the radii of curvature at the outward and inward corners by way of a second draw forming step, but in that case wrinkling may occur in the flange portion. When using the formed product as a battery case, the flange portion is often used as a sealing surface, and there is therefore a need to suppress the occurrence of wrinkling in the flange portion.

An object of the present invention is to provide a press forming method for forming a formed product having a hat-shaped cross section by press forming, wherein the radii of curvature at the outward and inward corners can be made small while suppressing the occurrence of wrinkling and cracking.

Means for Solving the Problems (1) A press forming method according to the present invention is a method for forming, from a workpiece (for example, a workpiece W described below), a formed product (for example, a formed product 9 described below) that has a hat shape as seen in cross section, and is provided with a top surface portion (for example, a top surface portion 90 described below) that is orthogonal to a pressing direction (for example, a pressing direction F described below), a vertical wall portion (for example, a vertical wall portion 92 described below) extending in the pressing direction from an edge portion of the top surface portion, a flange portion (for example, a flange portion 94 described below) that is orthogonal to the pressing direction from an edge portion of the vertical wall portion, an outward corner portion (for example, an outward corner portion 91 described below) between the top surface portion and the vertical wall portion, and an inward corner portion (for example, an inward corner portion 93 described below) between the vertical wall portion and the flange portion, the press forming method comprising a draw forming step (for example, S1 in FIG. 2 described below) and a restrike forming step (for example, S2 in FIG. 2 described below), wherein in the draw forming step, an intermediate formed product (for example, an intermediate formed product 8 described below) including a protruding portion (for example, a protruding portion 81 described below) corresponding to the outward corner portion and a recessed portion (for example, a recessed portion 83) corresponding to the inward corner portion is formed from the workpiece, radii of curvature of the protruding portion and the recessed portion as seen in cross section are greater than those of the outward corner portion and the inward corner portion, and a cross-sectional shape of the protruding portion is caused to bulge further toward the top surface portion in the pressing direction than the outward corner portion, and in the restrike forming step, the outward corner portion and the inward corner portion are formed by pressing the protruding portion down in the pressing direction toward the recessed portion, while an inward portion (for example, a first intermediate flat portion 87 described later) of the intermediate formed product inward of the protruding portion and an outward portion (for example, an outer peripheral edge portion of an intermediate flange portion 34 described below) of the intermediate formed product outward of the recessed portion are restrained so as to suppress outflow of material outward from the inward portion and inflow of material inward from the outward portion.

(2) In this case, it is preferable that, in the restrike forming step, a bent portion (for example, a bent portion 96 described below) having a step shape be formed while restraining an outer peripheral edge portion outward of the recessed portion of the intermediate formed product to suppress inflow of material inward from the outward portion, and in the formed product, radii of curvature of curved outward corner portions (for example, a first curved outward corner portion O1a and a second curved outward corner portion S1b) that are portions of the outward corner portion that curve as seen in the plan view in the pressing direction be greater than radii of curvature as seen in a plan view of portions of the bent portion outward in a peripheral direction of the curved outward corner portions.

(3) In this case, it is preferable that, in the restrike forming step, a first flat portion (for example, a first flat portion 97 described below) be formed in the top surface portion of the formed product by restraining a first intermediate flat portion (for example, a first intermediate flat portion 87 described below) of the intermediate formed product inward of the protruding portion with a pad die (for example, a pad die 42 described below), and in the formed product, a step portion (for example, a step portion 95 described below) be formed between the first flat portion and a second flat portion (for example, a second flat portion 98 described below) outward of the first flat portion of the top surface portion, such that the second flat portion is further toward the flange portion in the pressing direction than the first flat portion.

(4) In this case, it is preferable that the workpiece be a plate member of aluminum or an aluminum alloy.

Effects of the Invention (1) In the press forming method according to the present invention, a formed product which has a hat shape as seen in cross section, and which is provided with a top surface portion, an outward corner portion, a vertical wall portion, an inward corner portion, and a flange portion, is formed by way of a draw forming step and a restrike forming step. In the draw forming step, an intermediate formed product including a protruding portion corresponding to the outward corner portion and a recessed portion corresponding to the inward corner portion is formed. In the draw forming step, the radii of curvature of the protruding portion and the recessed portion are greater than those of the outward corner portion and the inward corner portion in the formed product, and the cross-sectional shape of the protruding portion is caused to bulge further toward the top surface portion in a pressing direction than the outward corner portion. This suppresses the occurrence of cracking in the protruding portion and the recessed portion that will form the outward corner portion and the inward corner portion, and secures the required material for forming the outward, corner portion and the inward corner portion in the subsequent restrike forming step. In the restrike forming step, the outward corner portion and the inward corner portion are formed by pressing the protruding portion down in the pressing direction toward the recessed portion, while outflow of material outward from the inward portion of the protruding portion and inflow of material inward from the outward portion of the recessed portion are suppressed by restraining the inward portion of the intermediate formed product inward of the protruding portion and the outward portion thereof outward of the recessed portion. This allows for the material of the protruding portion formed in the draw forming step to be moved to the vertical wall portion, while the vertical wall portion is extended in the pressing direction toward the inward corner portion, whereby an outward corner portion and an inward corner portion having small radii of curvature can be formed while suppressing the occurrence of wrinkling and cracking in the top surface portion, the outward corner portion, the vertical wall portion, the inward corner portion, and the flange portion.

(2) In the restrike forming step, a bent portion having a step shape is formed while restraining an outer peripheral edge portion outward of the recessed portion of the intermediate formed product to suppress inflow of material inward from the outer peripheral edge portion. In the formed product obtained by way of the restrike forming step, radii of curvature of curved outward corner portions that are portions of the outward corner portion that curve as seen in a plan view are greater than a radius of curvature of a portion of the bent portion outward in a peripheral direction of the curved outward corner portion. This allows for suppressing the occurrence of wrinkling in the portion of the flange portion inward of the bent portion of the formed product, and therefore, when the formed product is used as a battery case, the flange portion can be used as a sealing surface.

(3) In the restrike forming step, a first flat portion is formed in the top surface portion of the formed product by restraining the first intermediate flat, portion of the intermediate formed product inward of the protruding portion with a pad die. In the formed product obtained by way of the restrike forming step, a step portion is formed between the first flat portion and a second flat portion outward of the first flat portion of the top surface portion, such that the second flat portion is further toward the flange portion in the pressing direction than the first flat portion. By forming such a step portion, any wrinkling that may occur between the first flat portion and the outward corner portion when pressing the protruding portion down in the pressing direction toward the flange portion in the restrike forming step can be made less conspicuous.

(4) In general, when forming a plate member of aluminum or an aluminum alloy by deep-drawing, cracking is likely to occur due to localized extension. However, according to the present invention, by forming the formed product from a workpiece of aluminum or an aluminum alloy by way of the draw forming step and the restrike forming step described above, an outward corner portion and an inward corner portion having small radii of curvature can be formed while suppressing the occurrence of wrinkling and cracking.

BRIEF DESCRIPTION OF THE DRAWINGS

FIG. 2 is a flowchart illustrating the specific sequence of the press forming method;

PREFERRED MODE FOR CARRYING OUT THE INVENTION

A press forming method according to an embodiment of the present invention is described below with reference to the drawings.

Figure 1A:
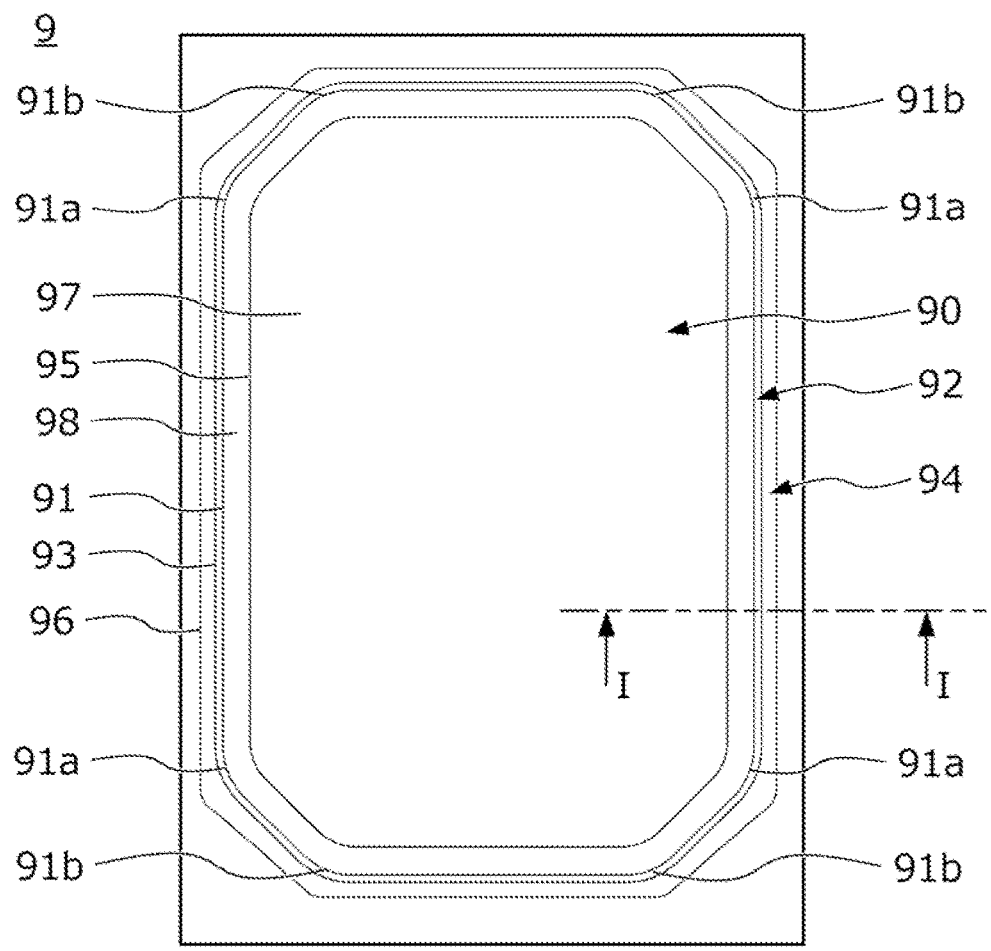
FIG. 1A is a plan view seen from the outside of a formed product, formed by a press forming method according to an embodiment of the present invention.
Figure 1B:
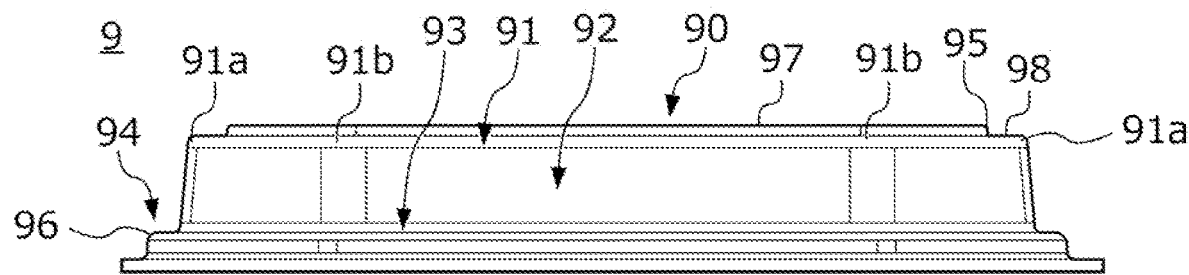
FIG. 1B is a front view of the formed product.
Figure 1C:
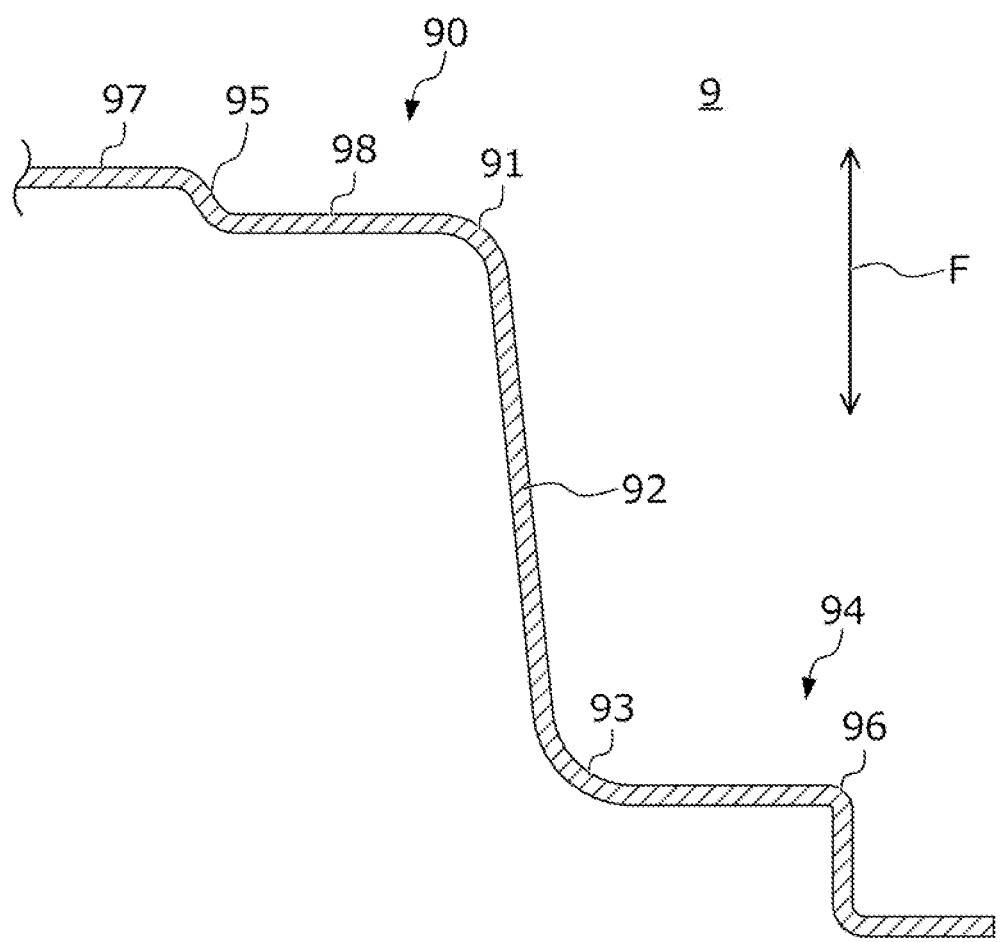
FIG. 1c is a cross-sectional view of the formed product taken along line I-I in FIG. 1A.
Figure 1D:
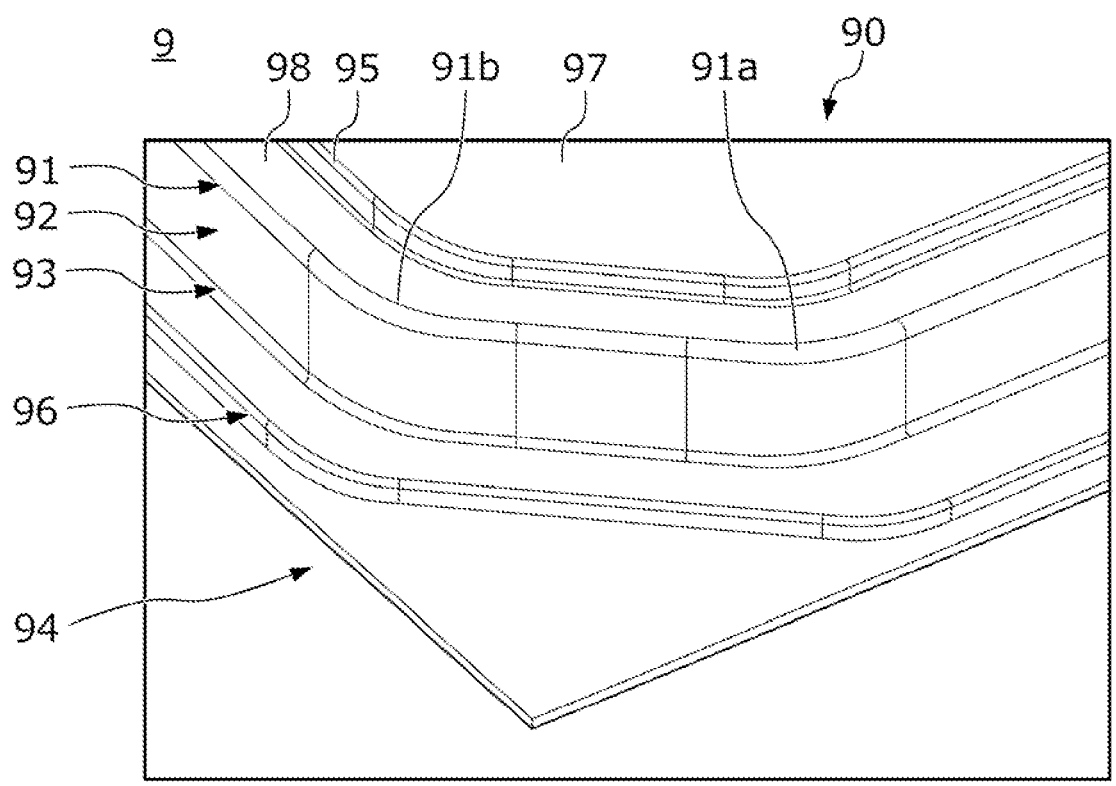
FIG. 1D is a partial perspective view of the formed product.

FIG. 1A is a plan view seen from the outside of a formed product 9 formed by a press forming method according to the present embodiment, FIG. 1B is a front view seen in a longitudinal direction of the formed product 9, FIG. 1C is a cross-sectional view of the formed product 9 taken along line I-I in FIG. 1A, and FIG. 1D is a partial perspective view of the formed product 9.

As illustrated in FIG. 1A to FIG. 1C, the formed product 9 has a rectangular shape as seen in a plan view and is in the form of a rectangular cylinder having a bottom. The formed product 9 has a hat shape as seen in cross section, and is formed from a plate-shaped workpiece by the press forming method described later. Described below is a case in which the formed product 9 is used as a battery case for housing a plurality of battery cells to be installed in a vehicle, but the present invention is not so limited.

The formed product 9 is provided with a top surface 90 extending along a plane that is approximately orthogonal to a pressing direction F (see FIG. 1C) in the press forming method and having a rectangular shape as seen in a plan view, a vertical wall portion 92 extending in the pressing direction F from the four edge portions of the top surface 90, and a flange portion 94 extending outwardly from an edge portion of the vertical wall portion 92 along a plane that is approximately orthogonal to the pressing direction F (i.e. approximately parallel to the top surface portion 90).

The vertical wall portion 92 is of a cylindrical shape connecting the top surface 90 and the flange portion 94, and is rectangular as seen in a plan view. As illustrated in FIG. 1C, the vertical wall portion 92 inclines slightly outwardly from the top surface portion 90 toward the flange portion 94. The vertical wall portion 92 and the top surface portion 90 are approximately orthogonal to each other, and the vertical wall portion 92 and the flange portion 94 are approximately orthogonal to each other. In the below description, the portion bending outwardly as seen in cross section between the top surface portion 90 and the vertical wall portion 92 is referred to as an outward corner portion 91, and the portion bending inwardly as seen in cross section between the vertical wall portion 92 and the flange portion 94 is referred to as an inward corner 93. The outward corner 91 and the inward corner 93 each has a rectangular shape as seen in a plan view. In the below description, in the outward corner portion 91, portions that curve with a predetermined radius of curvature R (see FIG. 9 described below) are referred to as a first curved outward corner portion 91a and a second curved outward corner portion 91b. Described below is a case in which, as illustrated in FIG. 1C, the radius of curvature as seen in cross section of the outward corner portion 91 is smaller than the radius of curvature as seen in cross section of the inward corner portion 93, but the present invention is not so limited.

In the top surface portion 90 inward of the outward corner portion 91, there is formed a step portion 95 having a rectangular shape as seen in a plan view. The step portion 95 forms a step as seen in cross section, as illustrated in FIG. 1C. In the below description, the portion of the top surface portion 90 inward of the step portion 95 is referred to as a first flat portion 97, and a portion outward of the step portion 95 is referred to as a second flat portion 93. The second flat portion 93 is closer to the flange portion 94 in the pressing direction F than the first flat portion 97. In other words, the second flat portion 93 is lower than the first flat portion 97.

At an outer peripheral edge portion of the flange portion 94, there is formed a bent portion 96 having a rectangular shape as seen in a plan view. The bent portion 96 forms a step, as illustrated in FIG. 1C. The portion of the flange portion 94 inward of the bent portion 96 is closer to the top surface 90 in the pressing direction F than the portion outward of the bent portion 96. In other words, the portion of the flange portion 94 outward of the bent portion 96 is lower than the inward portion.

In general, when forming a formed product 9 provided with an outward corner portion 91, a vertical wall portion 92, and an inward corner portion 93 as described above from a flat plate-shaped workpiece by way of only one draw forming step, cracking is likely to occur in the outward corner portion 91, the vertical wall portion 92, and the inward corner portion 93. Among the outward corner portion 91, the vertical wall portion 92, and the inward corner portion 93, cracking is particularly likely to occur in the first curved outward corner portion 91a and the second curved outward corner portion 91b.

In order to suppress the occurrence of cracking as described above, it would be conceivable to form the formed product 9 from the flat plate-shaped workpiece by way of two draw forming steps. However, when forming the formed product 9 by way of two draw forming steps, wrinkling may occur in the flange portion 94. Wrinkling tends to occur particularly in the portion of the flange portion 94 outward in the peripheral direction relative to the first curved outward corner portion 91a and the second curved outward corner portion 91b as seen in a plan view. Described below is a press forming method that suppresses the occurrence of wrinkling and cracking in such a formed product 9.

In the below description, a plate member of aluminum or an aluminum alloy, which are suitable materials for battery cases and are prone to cracking, was used as the workpiece, but the present invention is not so limited.

FIG. 2 is a flowchart illustrating the specific sequence of the press forming method according to the present embodiment. As illustrated in FIG. 2, the formed product 9 as illustrated in FIG. 1 is formed from a single workpiece by way of a draw forming step (S1) and a restrike forming step (S2). The specific sequence of the draw forming step and the restrike forming step is described below.

Figure 3:
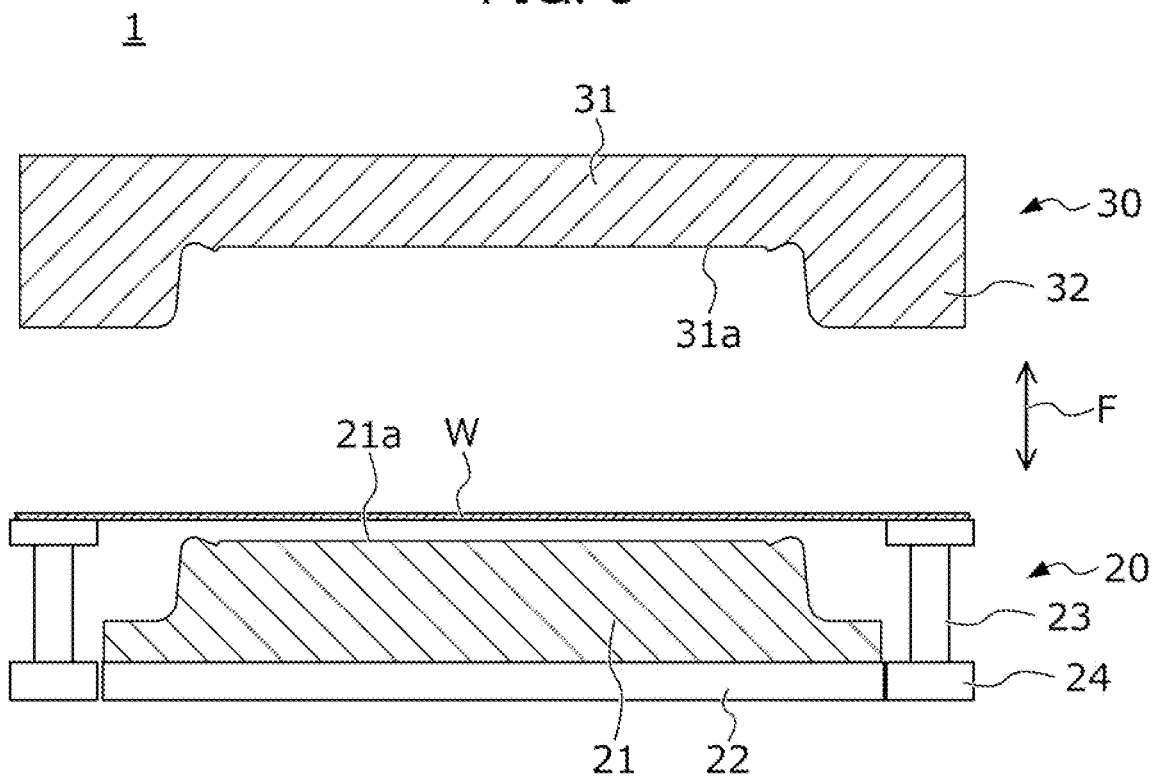
FIG. 3 illustrates the configuration of a first pressing device used in the draw forming step.

FIG. 3 illustrates the configuration of a first pressing device 1 used in the draw forming step. The first pressing device 1 has a lower die mechanism 20 having a lower die 21 arranged below a plate-shaped workpiece W, and an upper die mechanism 30 that causes an upper die 31 to approach or separate from the lower die 21 in the pressing direction F.

The upper die mechanism 30 causes the upper die 31 to approach or separate from the lower die 21 by means of, for example, a servo motor. The upper die 31 presses the workpiece W together with the lower die 21, and the lower surface of the upper die 31 has formed therein a die surface 31a for contacting the upper surface of the workpiece W. The die surface 31a has a recessed shape facing the lower die 21. An annular holder 32 is provided around the upper die 31. The end surface of the holder 32 is horizontal, and protrudes slightly more toward the lower die 21 than the die surface 31a. Therefore, when the upper die mechanism 30 causes the upper die 31 to approach the lower die 21, the holder 32 comes into contact with the workpiece W before the die surface 31a does.

The lower die mechanism 20 is provided with the lower die 21, a base 22 supporting the lower die 21, an annular blank holder 23 supporting the portion of the workpiece W that will form the flange portion 94 of the formed product 9, and a die cushion mechanism 24 that raises or lowers the blank holder 23.

The lower die 21 is provided on top of the base 22 and presses the workpiece W together with the upper die 31. On the upper surface of the lower die 21 there is formed a die surface 21a for contacting the lower surface of the workpiece W. The die surface 21a has a protruding shape facing the upper die 31.

The blank holder 23 is provided in a position facing the holder 32 in the pressing direction F, and clamps the outer peripheral edge portion of the workpiece W together with the holder 32 in order to prevent the occurrence of wrinkling and displacement, etc. when pressing the workpiece W. The die cushion mechanism 24 raises or lowers the blank holder 23 in the pressing direction F by means of an elevating mechanism not shown here.

In the draw forming step, the workpiece W is formed by using the first pressing device 1 in the following manner. First, after raising the blank holder 23 to a position higher than the lower die 21, the workpiece W is placed on the blank holder 23. Next, the upper die 31 is caused to approach the lower die 21. When the upper die 31 is caused to approach the lower die 21 as described above, the holder 32 comes into contact with the workpiece W before the die surface 31a does, whereby the outer peripheral edge portion of the workpiece W is clamped between the holder 32 and the blank holder 23. As the upper die 31 further approaches the lower die 21, the die surface 31a of the upper die 31 and the die surface 21a of the lower die 21 come into contact with both surfaces of the workpiece W. The workpiece W is thus formed into a shape mimicking the die surface 21a. In the below description, the formed product formed from the workpiece W in the draw forming step is referred to as an intermediate formed product.

Figure 4:
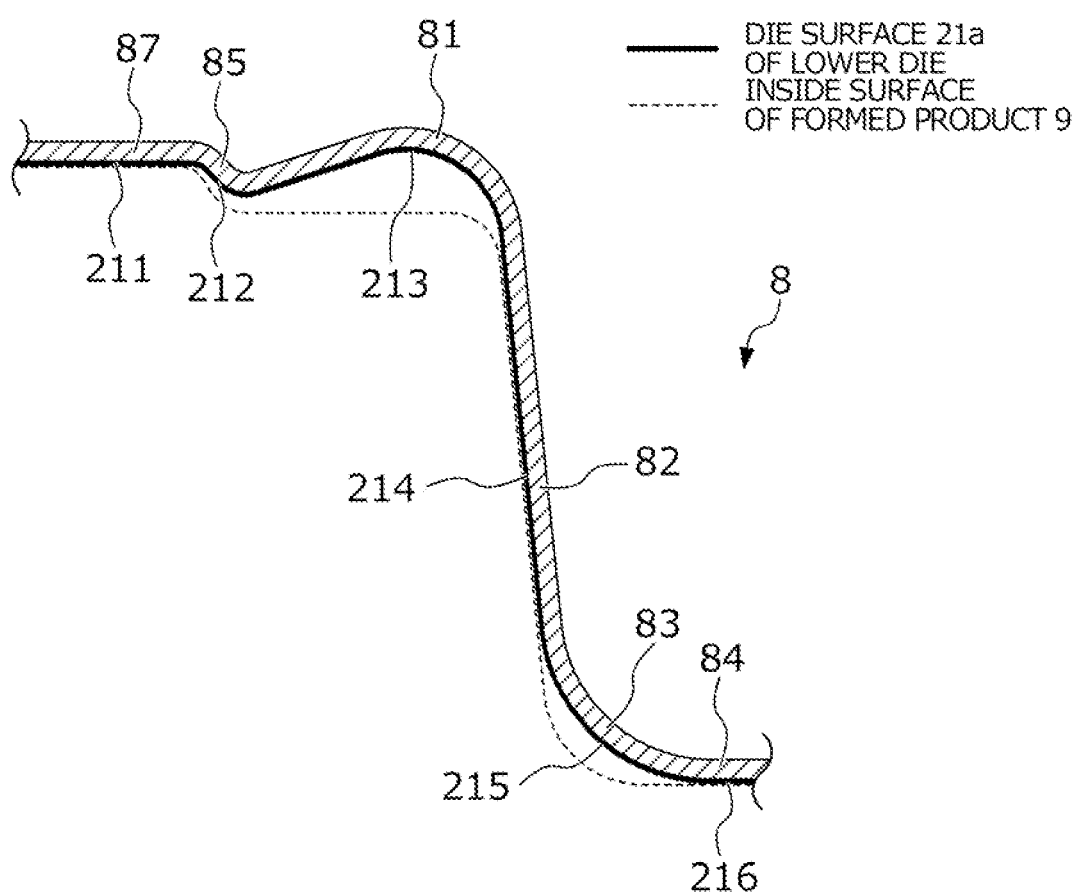
FIG. 4 illustrates a comparison of the cross-sectional shape of an intermediate formed product formed by way of the draw forming step and the cross-sectional shape of the formed product.

FIG. 4 illustrates a comparison of the cross-sectional shape of the intermediate formed product 8 formed by way of the draw forming step and the cross-sectional shape of the formed product 9. In FIG. 4, the die surface 21a of the lower die used in the draw forming step is illustrated by a thick line, and the die surface of a lower die used in the subsequent restrike forming step, that is to say the inside surface of the formed product 9, is illustrated by a dashed line.

The die surface 21a of the lower die used in the draw forming step is provided with, in order from the inside toward the outside, a top surface 211, a step surface 212, a protruding surface 213, a vertical wall surface 214, a recessed surface 215, and a flange surface 216. As illustrated in FIG. 4, in the intermediate formed product 8, a first intermediate flat portion 87 corresponding to the first flat portion 97 in the formed product 9 is formed by the top surface 211, an intermediate step portion 85 corresponding to the step portion 95 in the formed product 9 is formed by the step surface 212, a protruding portion 81 corresponding to the second flat portion 98 and the outward corner portion 91 in the formed product 9 is formed by the protruding surface 213, an intermediate vertical wall portion 82 corresponding to the vertical wall portion 92 in the formed product 9 is formed by the vertical wall surface 214, a recessed portion 83 corresponding to the inward corner portion 93 in the formed product 9 is formed by the recessed surface 215, and an intermediate flange portion 84 corresponding to the flange portion 94 in the formed product 9 is formed by the flange surface 216.

As illustrated in FIG. 4, in the die surface 21a of the lower die used in the draw forming step, the shapes of the top surface 211, the step surface 212, the vertical wall surface 214, and the flange surface 216 are approximately the same as the inside surface of the formed product 9, but the shapes of the protruding surface 213 and the recessed surface 215 differ from the inside surface of the formed product 9. More specifically, the radii of curvature of the protruding surface 213 and the recessed surface 215 as seen in cross section are greater than the respective radii of curvature of the inside surface of the formed product 9 as seen in cross section. In addition, the protruding surface 213 bulges further toward the top surface 211 in the pressing direction F than the inside surface of the formed product 9 as seen in cross section.

Therefore, in the intermediate formed product 8 formed by way of the draw forming step as described above, the radii of curvature of the protruding portion 81 and the recessed portion 83 as seen in cross section are greater than the radii of curvature of the outward corner portion 91 and the inward corner portion 93 of the formed product 9 as seen in cross section, and the cross-sectional shape of the protruding portion 81 bulges further toward the top surface portion 90 in the pressing direction F than the second flat portion 98 and the outward corner portion 91.

As illustrated in FIG. 4, a height in the pressing direction F from the intermediate flange portion 84 to the first intermediate flat portion 87 in the intermediate formed product 8 is equal to a height in the pressing direction F from the flange portion 94 to the first flat portion 97 in the formed product 9.

Figure 5:
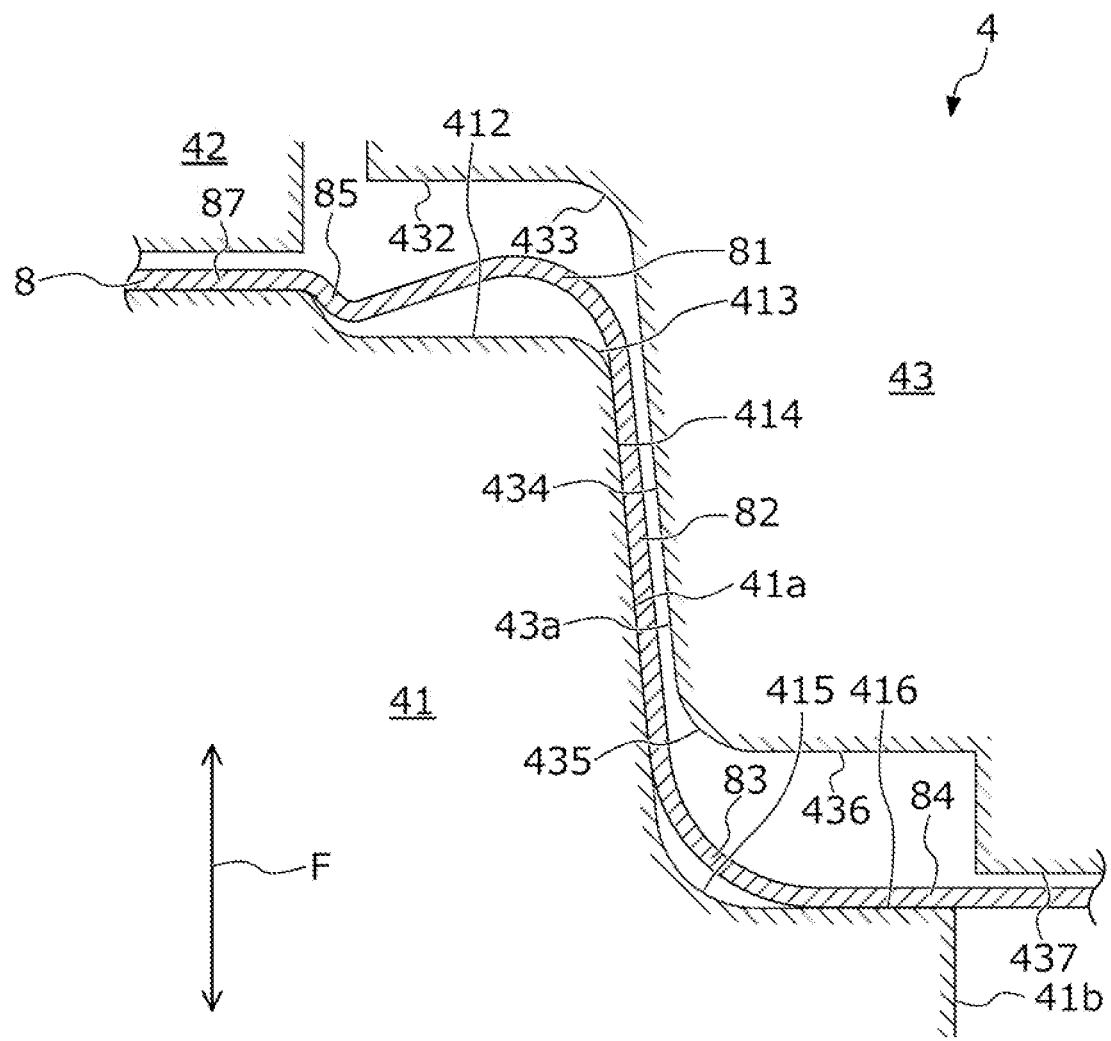
FIG. 5 illustrates the configuration of a second pressing device used in the restrike forming step.

FIG. 5 illustrates the configuration of a second pressing device 4 used in the restrike forming step (see FIG. 2, S2). FIG. 5 illustrates a state wherein the intermediate formed product 8 formed by way of the above draw forming step is placed in the second pressing device 4.

The second pressing device 4 is provided with a lower die 41, a pad actuator (not shown) that causes a pad die 42 to approach or separate from the lower die 41, and a movable die actuator (not shown) that causes a movable die 43 to approach or separate from the lower die 41.

The shape of a die surface 41a of the lower die 41 mimics the shape of the portion of the formed product 9 inward of the bent portion 96. More specifically, the die surface 41a of the lower die 41 is provided with, in order from the inside toward the outside, a top surface 412, a protruding surface 413, a vertical wall surface 414, a recessed surface 415, and a flange surface 416. The surface of the pad die 42 is approximately flat, and has approximately the same shape as the first flat portion 97 of the formed product 9 as seen in a plan view in the pressing direction F. Therefore, by pressing the pad die 42 against the first intermediate flat, portion 87 of the intermediate formed product 8 by means of the pad actuator, outflow of material outward from the first intermediate flat portion 87 can be suppressed.

The shape of a die surface 43a of the movable die 43 mimics the portion of the formed product 9 outward of the first flat portion 97, More specifically, the die surface 43a of the movable die 43 is provided with, in order from the inside toward the outside, a top surface 432, a recessed surface 433, a vertical wall surface 434, a protruding surface 435, and a flange surface 436. The movable die 43 is also provided with, outward of the flange surface 436, a fixing portion 437 protruding further toward the lower die 41 in the pressing direction F than the flange surface 436. Therefore, when the movable die 43 is caused to approach the lower die 41 in the pressing direction F by means of the movable die actuator, the fixing portion 437 comes into contact with the intermediate formed product 8 before the die surface 43a does.

As is obvious from a comparison of FIG. 5 and FIG. 1D, in the formed product 9, the first flat portion 97 is formed by the pad die 42, the step portion 95 and the second flat portion 98 are formed by the top surface 432, the outward corner portion 91 is formed by the protruding surface 413, the vertical wall portion 92 is formed by the vertical wall surfaces 414 and 434, the inward corner portion 93 is formed by the protruding surface 435, the portion of the flange portion 94 inward of the bent portion 96 is formed by the flange surface 436, and the portion of the flange portion 94 outward of the bent portion 96, and the bent portion 96 itself, are formed by the fixing portion 437.

In the restrike forming step, the formed product 9 is formed from the intermediate formed product 8 by using the second pressing device 4 in the following manner. First, the pad die 42 is pressed against the first intermediate flat portion 37 of the intermediate formed product 3 by means of the pad actuator. This suppresses outflow of material outward from the first intermediate flat portion 87 of the intermediate formed product 8. Next, the movable die 43 is caused to approach the lower die 41. When the movable die 43 is caused to approach the lower die 41 as described above, the fixing portion 437 comes into contact with the intermediate flange portion 84 of the intermediate formed product 8 before the die surface 43a does. Then, as the movable die 43 further approaches the lower die 41, the outer peripheral edge portion of the intermediate flange portion 84 is bent by the fixing portion 437, and is restrained between the fixing portion 437 and a side surface 41b outward of the die surface 41a of the lower die 41. Thus, the bent portion 96 is formed while suppressing inflow of material inward from the outer peripheral edge portion of the flange portion 84 of the intermediate formed product B. In the restrike forming step, the formed product 9 is formed in this way by lowering the movable die 43 to a bottom dead center to press the protruding portion 81 of the intermediate formed product B down in the pressing direction F toward the recessed portion 83, while suppressing outflow of material outward from the first intermediate flat portion 87 and inflow of material inward from the outer peripheral edge portion of the intermediate flange portion 84.

Figure 6:
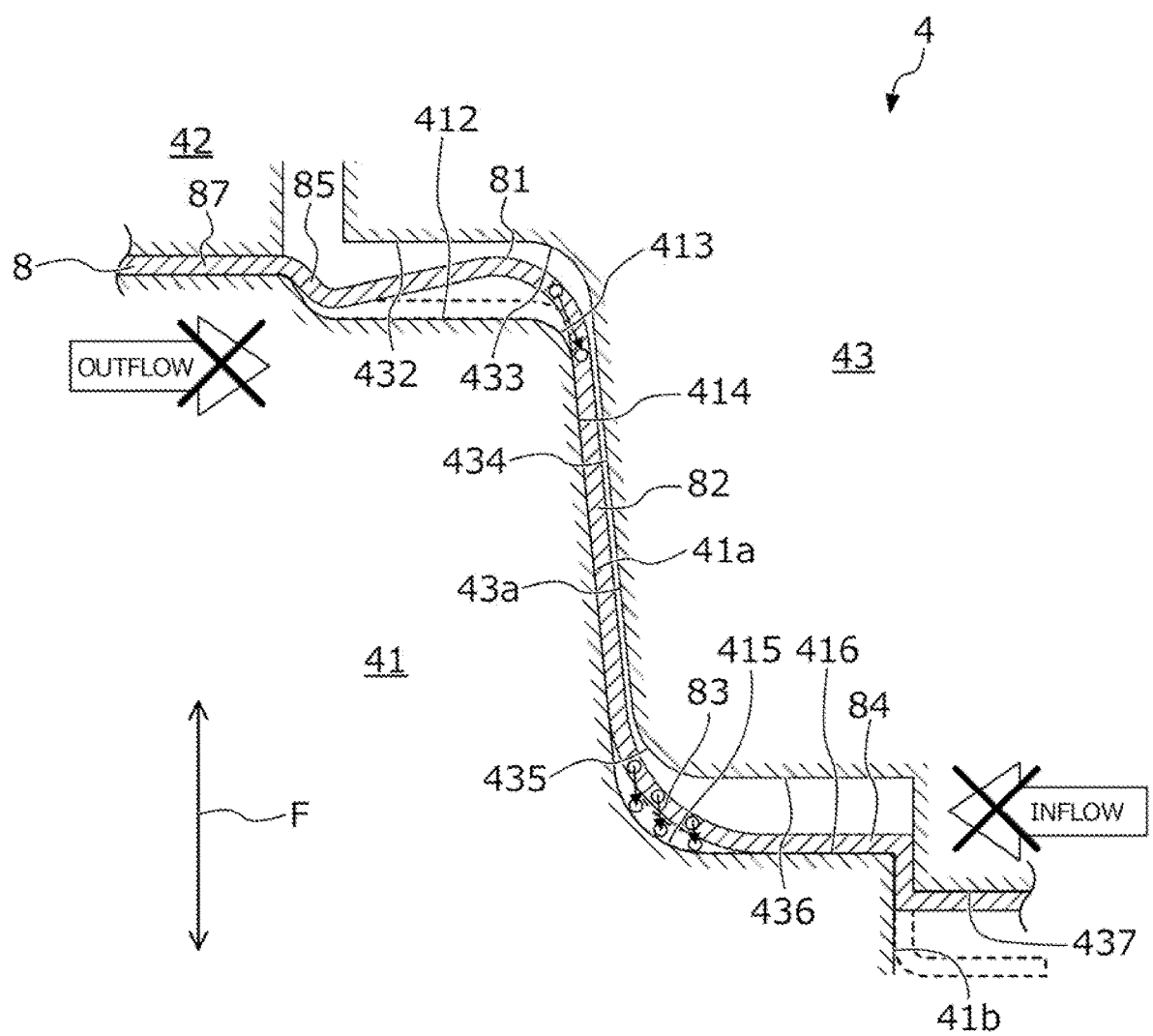
FIG. 6 is a cross-sectional view of the intermediate formed product for describing a movement of material in the restrike forming step.

FIG. 6 is a cross-sectional view of the intermediate formed product 8 for describing a movement of material in the restrike forming step. In FIG. 6, the formed product. 9 formed from the intermediate formed product 8 by way of the restrike forming step is illustrated in dashed lines.

In the restrike forming step, when the movable die 43 is caused to approach the lower die 41 while suppressing outflow of material outward from the first intermediate flat portion 87 and inflow of material inward from the outer peripheral edge portion of the intermediate flange portion 84 by means of the pad die 42 and the fixing portion 437, the protruding surface 435 comes into contact with the recessed portion 83 as illustrated in FIG. 6, and the vertical wall surface 434 slides against the intermediate vertical wall portion 82. Therefore, the material of the protruding portion 81 is pulled between the die surface 41a and the vertical wall surface 434 to move outward in the peripheral direction. In addition, the material of the intermediate vertical wall portion 82 and the protrusion 81 is pulled between the vertical wall surface 434 and the recessed surface 413 to move toward the flange surface 436 in the pressing direction F. As the movable die 43 further approaches the lower die 41 in the pressing direction F, the top surface 432 and the protruding portion 81 come into contact near the bottom dead center, whereby the radii of curvature of the protruding portion 81 and the recessed portion 83 of the intermediate formed product 3 become smaller, and thus the outward corner portion 91 and the inward corner portion 93 are formed.

Figure 7A:
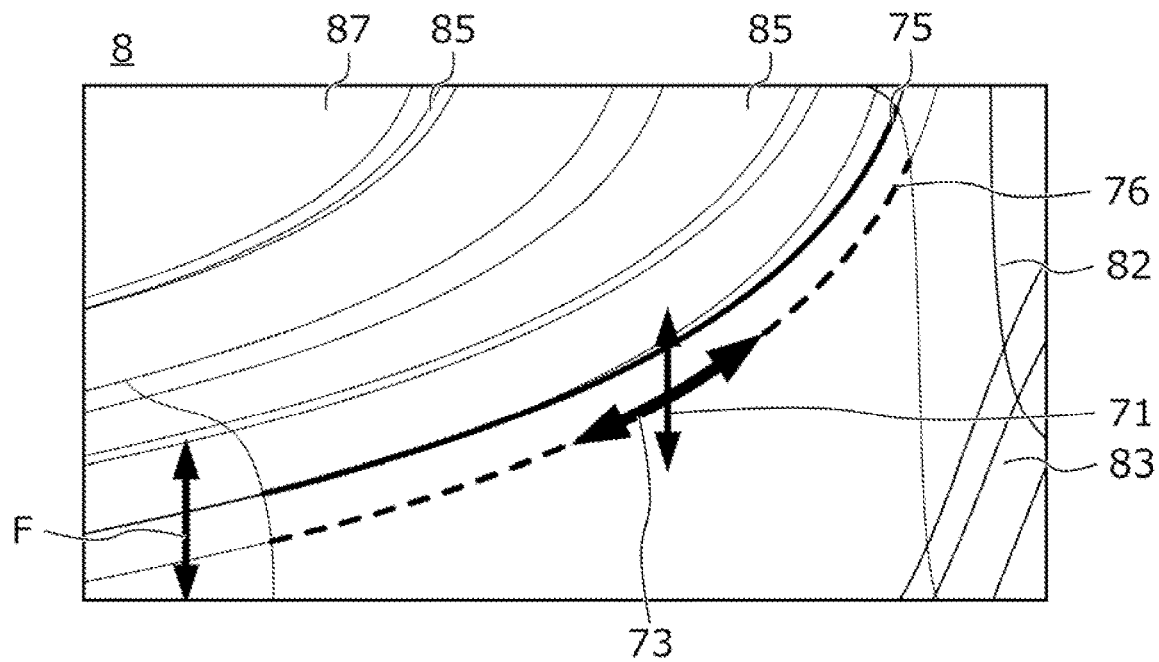
FIG. 7A is a partial perspective view of a portion of the intermediate formed product corresponding to a first curved outward corner portion of the formed product for describing extension of material in the draw forming step and the restrike forming step.
Figure 7B:
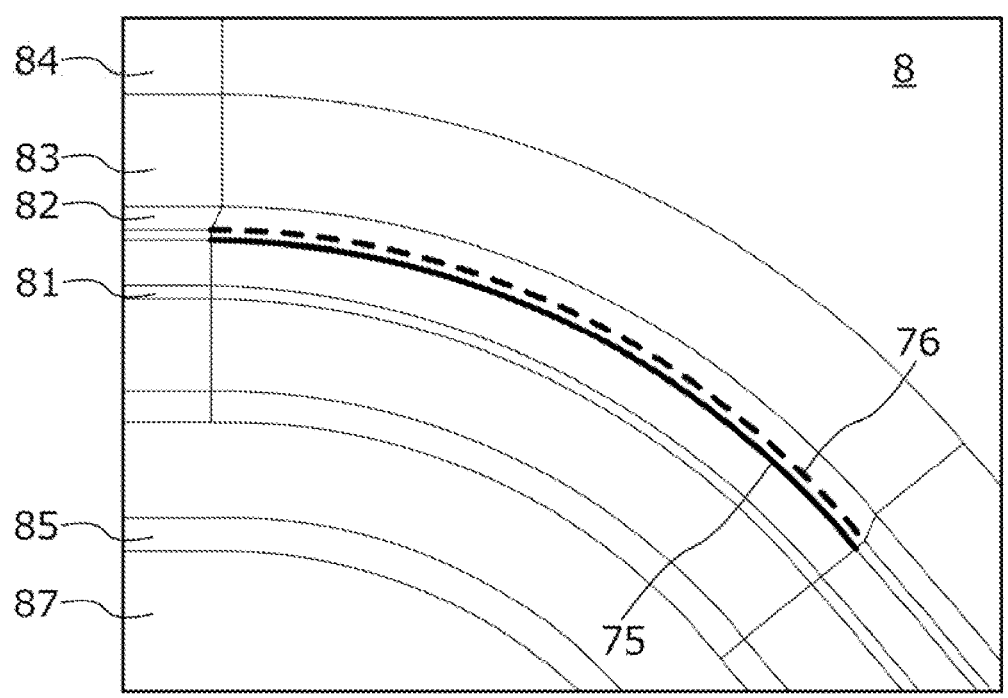
FIG. 7B is a plan view of the portion of the intermediate formed product corresponding to the first curved outward corner portion of the formed product for describing extension of material in the draw forming step and the restrike forming step.

FIG. 7A is a partial perspective view of a portion of the intermediate formed product 8 corresponding to the first curved outward corner portion 91a of the formed product 9 for describing extension of material in the draw forming step and the restrike forming step. FIG. 7B is a plan view of the same portion as in FIG. 7A for describing extension of material in the draw forming step and the restrike forming step. As described above, the first curved outward corner portion 91a and the second curved outward corner portion 91b are portions of the formed product 9 prone to cracking. In FIG. 7A, the arrow 71 indicates extension of material in the draw forming step, and the arrow 73 indicates extension of material in the restrike forming step. It should be noted that the extension of the portion corresponding to the second curved outward corner portion 91b is qualitatively the same as the extension of the portion corresponding to the first curved outward corner portion 91a, and thus description thereof is omitted.

As illustrated in FIG. 7A, the extension of the portion that will form the first curved outward corner portion 91a in the formed product 9 mainly occurs in the pressing direction F in the draw forming step. The portion of the protruding portion 81 of the intermediate formed product 8 indicated by a thick solid line 75 moves toward the portion indicated by a thick dashed line 76 in the restrike forming step (see FIGS. 7A and 7B). In this way, the extension of the portion that will form the first curved outward corner portion 91a in the formed product 9 mainly occurs in a direction of a plane orthogonal to the pressing direction F in the restrike forming step.

Figure 8:
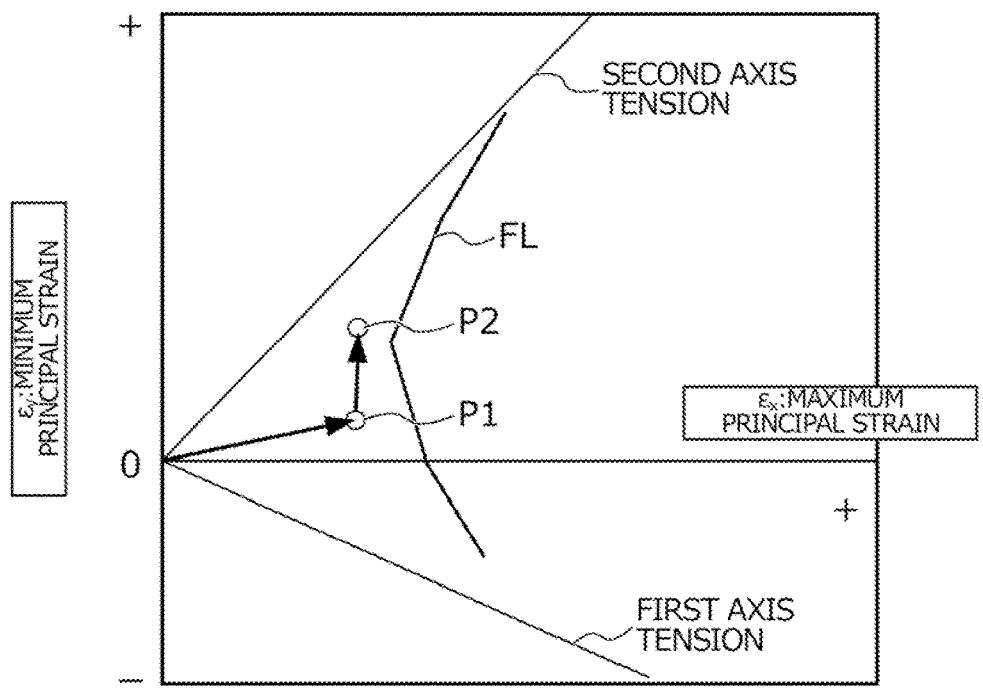
FIG. 8 plots a state of strain in the draw forming step and the restrike forming step of the portion that will form the first curved outward corner portion in the formed product in a forming limit diagram.

FIG. 8 plots a state of strain in the draw forming step and the restrike forming step of the portion that will form the first curved outward corner portion 81a in the formed product 9 in a forming limit diagram, wherein the horizontal axis is a maximum strain $\varepsilon x$ and the vertical axis is a minimum strain $\varepsilon y$. In FIG. 8, the thick solid line indicates a forming limit FL. That is to say, when the strain exceeds this forming limit FL, cracking or necking occurs in the formed product.

As described above, the extension of the material in the draw forming step mainly occurs in the pressing direction. Therefore, the strain state after the draw forming step changes into the state indicated by the point P1 in FIG. 8. The extension of the material in the restrike forming step mainly occurs in the direction of a plane orthogonal to the pressing direction. Therefore, the strain state of the formed product 9 after the restrike forming step changes into the state indicated by the point P2 in FIG. 8. As described above, the press forming method according to the present embodiment can suppress the occurrence of cracking and necking by forming the formed product 9 by way of the two steps of draw forming and restrike forming.

Figure 9:
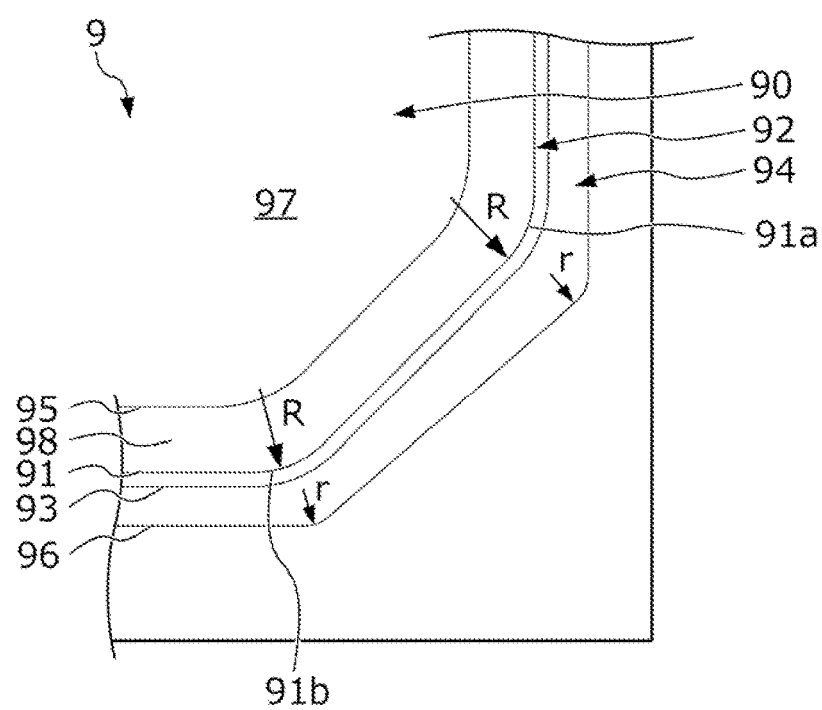
FIG. 9 is a plan view illustrating the vicinity of the first curved outward corner portion and a second curved outward corner portion of the formed product.

FIG. 9 is a plan view illustrating the vicinity of the first curved outward corner portion 91a and the second curved outward corner portion 91b of the formed product 9. As described above, the bent portion 96 of the formed product 9 is formed by the fixing portion 437 of the movable die 43 in the restrike forming step. In the restrike forming step, the bent portion 96 is preferably formed such that the radii of curvature R of the first curved outward corner portion 91a and the second curved outward corner portion 91b become greater than the radii of curvature r as seen in a plan view of the portion of the bent portion 96 outward in the peripheral direction of the first curved outward corner portion 91a and the second curved outward corner portion 91b, as illustrated in FIG. 9. This allows for suppressing the occurrence of wrinkling in the portion of the flange portion 94 inward of the bent portion 96.

The press forming method according to the present embodiment exhibits the following effects.

(1) In the present press forming method, a formed product 9 which has a hat shape as seen in cross section, and which is provided with a top surface portion 90, an outward corner portion 91, a vertical wall portion 92, an inward corner portion 93, and a flange portion 94, is formed by way of a draw forming step and a restrike forming step. In the draw forming step, an intermediate formed product 8 including a protruding portion 81 corresponding to the outward corner portion 91 in the formed product 9 and a recessed portion 83 corresponding to the inward corner portion 93 is formed from a workpiece W. In the draw forming step, the radii of curvature of the protruding portion 81 and the recessed portion 83 as seen in cross section are greater than those of the outward corner portion 91 and the inward corner portion 93, and the cross-sectional shape of the protruding portion 81 is caused to bulge further toward the top surface portion 90 in the pressing direction F than the outward corner portion 91. This suppresses the occurrence of cracking in the protruding portion 81 and the recessed portion 83 that will form the outward corner portion 91 and the inward corner portion 93, and secures the required material for forming the outward corner portion 91 and the inward corner portion 93 in the subsequent restrike forming step. In the restrike forming step, the outward corner portion 91 and the inward corner portion 93 are formed by pressing the protruding portion 81 down in the pressing direction W toward the recessed portion 83, while an inward portion of the intermediate formed product 8 inward of the protruding portion 81 and an outward portion thereof outward of the recessed portion 83 are restrained so as to suppress outflow of material outward from the inward portion of the protruding portion 81 and inflow of material inward from the outward portion of the recessed portion 83. This allows for the material of the protruding portion 81 formed in the draw forming step to be moved to the vertical wall portion 92, while the vertical wall portion 92 is extended in the pressing direction F toward the inward corner portion 93, whereby the outward corner portion 91 and the inward corner portion 93 having small radii of curvature can be formed while suppressing the occurrence of wrinkling and cracking in the top surface portion 90, the outward corner portion 91, the vertical wall portion 92, the inward corner portion 93, and the flange portion 94.

(2) In the restrike forming step, a bent portion 96 having a step shape is formed while restraining an outer peripheral edge portion outward of the recessed portion 83 of the intermediate formed product 8 to suppress inflow of material inward from the outer peripheral edge portion. In the formed product 9 obtained by way of the restrike forming step, radii of curvature R of a first curved outward corner portion 91a and a second curved outward corner portion 91b that are portions of the outward corner portion 91 that curve as seen in a plan view are greater than radii of curvature r of portions of the bent portion 96 outward in a peripheral direction of the curved outward corner portions 91a, 91b. This allows for suppressing the occurrence of wrinkling in the portion of the flange portion 94 inward of the bent portion 96 of the formed product 9, and therefore, when the formed product S is used as a battery case, the flange portion 94 can be used as a sealing surface.

(3) In the restrike forming step, a first flat portion 96 is formed in the top surface portion 90 of the formed product 9 by restraining the first intermediate flat portion 87 of the intermediate formed product 8 inward of the protruding portion 81 with a pad die 42. In the formed product 9 obtained by way of the restrike forming step, a step portion 95 is formed between the first flat portion 97 and a second flat portion 98 outward of the first flat portion 97 of the top surface portion 90, such that the second flat portion 98 is further toward the flange portion 94 in the pressing direction F than the first flat portion 97. By forming such a step portion 95, any wrinkling that may occur between the first flat, portion 97 and the outward corner portion 91 when pressing the protruding portion 81 down in the pressing direction F toward the flange portion 94 in the restrike forming step can be made less conspicuous.

(4) In general, when forming a plate member of aluminum or an aluminum alloy by deep-drawing, cracking is likely to occur due to localized extension. However, according to the present invention, by forming the formed product 9 from a workpiece W of aluminum or an aluminum alloy by way of the draw forming step and the restrike forming step described above, an outward corner portion 91 and an inward corner portion 93 having small radii of curvature can be formed while suppressing the occurrence of wrinkling and cracking.

An embodiment of the present invention has been described above, but the present invention is not limited to this embodiment, various modifications to the detailed configurations are possible without departing from the spirit and scope of the present invention.

EXPLANATION OF REFERENCE NUMERALS

W Workpiece
1 First pressing device
21 Lower die
21a Die surface
211 Top surface
212 Step surface
213 Protruding surface
214 Vertical wall surface
215 Recessed surface
216 Flange surface
4 Second pressing device
41 Lower die
41a Die surface
412 Top surface
413 Protruding surface
414 Vertical wall surface
415 Recessed surface
416 Flange surface
42 Pad die
43 Movable die
43a Die surface
432 Top surface
433 Recessed surface
434 Vertical wall surface
435 Protruding surface
436 Flange surface
437 Fixing portion
8 Intermediate formed product
81 Protruding portion
82 Intermediate vertical wall portion
83 Recessed portion
84 Intermediate flange portion
85 Intermediate step portion
87 First intermediate flat portion
9 Formed product
90 Top surface portion
91 Outward corner portion
91a First curved outward corner portion (curved outward corner portion)
91b Second curved outward corner portion (curved outward corner portion)
92 Vertical wall portion
93 Inward corner portion 94 Flange portion
95 Step portion
96 Bent portion
97 First flat portion
98 Second flat portion

The invention claimed is:

1. A press forming method for forming, from a workpiece, a formed product that has a hat shape as seen in cross section, and is provided with a top surface portion, a vertical wall portion extending in a direction perpendicular to the top surface portion from an edge portion of the top surface portion, a flange portion extending in a direction perpendicular to the vertical wall portion from an edge portion of the vertical wall portion, an outward corner portion between the top surface portion and the vertical wall portion, and an inward corner portion between the vertical wall portion and the flange portion, the press forming method comprising a draw forming step using a first pressing device and a restrike forming step using a second pressing device, wherein the first pressing device is equipped with a first lower die having a die surface that mimics an intermediate formed product including a protruding portion corresponding to the outward corner portion and a recessed portion corresponding to the inward corner portion, and a first upper die that is movable to approach and separate from the first lower die along a pressing direction, in the draw forming step, forming the intermediate formed product so that radii of curvature of the protruding portion and the recessed portion as seen in cross section are greater than those of the outward corner portion and the inward corner portion, and a cross-sectional shape of the protruding portion bulges toward the top surface portion in the pressing direction than the outward corner portion by pressing the workpiece between the first lower die and the first upper die, the second pressing device is equipped with a second lower die having a mold surface that mimics the formed product, and a pad die and a movable die that are movable to approach and separate from the second lower die along the pressing direction, and in the restrike forming step, forming the formed product by pressing the protruding portion of the intermediate formed product placed on the second lower die down in the pressing direction toward the recessed portion, while holding an inward portion of the intermediate formed product inward of the protruding portion and an outward portion of the intermediate formed product outward of the recessed portion with the pad die and the movable die so as to suppress outflow of material outward from the inward portion and inflow of material inward from the outward portion.

2. The press forming method according to claim 1, wherein in the restrike forming step, forming a bent portion having a step shape in the flange portion of the formed product while suppressing inflow of material inward from the outward portion by restraining an outer peripheral edge portion outward of the recessed portion of the intermediate formed product with the movable die, and in the formed product, radii of curvature of curved outward corner portions that are portions of the outward corner portion that curve as seen in a plan view in the pressing direction are greater than radii of curvature as seen in the plan view of portions of the bent portion outward in a peripheral direction of the curved outward corner portions.

3. The press forming method according to claim 1, wherein in the restrike forming step, forming a first flat portion in the top surface portion of the formed product by restraining a first intermediate flat portion of the intermediate formed product inward of the protruding portion with the pad die, and in the formed product, a step portion is formed between the first flat portion and a second flat portion outward of the first flat portion of the top surface portion, such that the second flat portion is further toward the flange portion in the pressing direction than the first flat portion.

4. The press forming method according to claim 1, wherein the workpiece is a plate member of aluminum or an aluminum alloy.

5. The press forming method according to claim 2, wherein in the restrike forming step, forming a first flat portion in the top surface portion of the formed product by restraining a first intermediate flat portion of the intermediate formed product inward of the protruding portion with the pad die, and in the formed product, a step portion is formed between the first flat portion and a second flat portion outward of the first flat portion of the top surface portion, such that the second flat portion is further toward the flange portion in the pressing direction than the first flat portion.

6. The press forming method according to claim 2, wherein the workpiece is a plate member of aluminum or an aluminum alloy.

7. The press forming method according to claim 3, wherein the workpiece is a plate member of aluminum or an aluminum alloy.

8. The press forming method according to claim 5, wherein the workpiece is a plate member of aluminum or an aluminum alloy.

* * * * *